(12) United States Patent
Lee et al.

(10) Patent No.: US 8,503,532 B2
(45) Date of Patent: Aug. 6, 2013

(54) METHOD AND APPARATUS FOR INTER PREDICTION ENCODING/DECODING AN IMAGE USING SUB-PIXEL MOTION ESTIMATION

(75) Inventors: Tammy Lee, Seoul (KR); Woo-jin Han, Suwon-si (KR); Sun-mi Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1257 days.

(21) Appl. No.: 12/211,438

(22) Filed: Sep. 16, 2008

(65) Prior Publication Data

US 2009/0092188 A1 Apr. 9, 2009

Related U.S. Application Data

(60) Provisional application No. 60/977,454, filed on Oct. 4, 2007.

(30) Foreign Application Priority Data

Dec. 13, 2007 (KR) ........................ 10-2007-0129904

(51) Int. Cl.
*H04B 1/66* (2006.01)

(52) U.S. Cl.
USPC ................................... 375/240.16

(58) Field of Classification Search
None
See application file for complete search history.

(56) References Cited

U.S. PATENT DOCUMENTS

| | | | |
|---|---|---|---|
| 5,771,079 A | 6/1998 | Kim | |
| 6,567,557 B1 | 5/2003 | Sigmund | |
| 6,757,330 B1 | 6/2004 | Hsu | |
| 2003/0021344 A1* | 1/2003 | Panusopone et al. | 375/240.16 |
| 2004/0240550 A1* | 12/2004 | Suzuki | 375/240.16 |
| 2007/0183504 A1* | 8/2007 | Hoffman et al. | 375/240.16 |
| 2008/0107181 A1 | 5/2008 | Han et al. | |

FOREIGN PATENT DOCUMENTS

| | | |
|---|---|---|
| JP | 2-62180 A | 3/1990 |
| JP | 7-95585 A | 4/1995 |
| JP | 2001-28756 A | 1/2001 |
| JP | 2006-174415 A | 6/2006 |
| JP | 2007-43651 A | 2/2007 |

OTHER PUBLICATIONS

Chen, et al. "Fast Integer Pel and Fractional Pel Motion Estimation for AVC." ISO/IEC, JTC1/SC29/WG11. MPEG2002/M9117. Nov. 30, 2002.

European Office Action, issued in corresponding European Application No. 08836732.1 on Oct. 7, 2011.

European Search Report issued in corresponding European Application No. 08836732.1 on Sep. 12, 2011.

(Continued)

*Primary Examiner* — David Pearson
(74) *Attorney, Agent, or Firm* — Sughrue Mion, PLLC (57) ABSTRACT

A method of inter prediction encoding of an image, the method including: searching for a first reference block in a reference picture by using a current block, and estimating a first motion vector in a first pel unit in regards to the first reference block; estimating a second motion vector by using pixels included in a pre-encoded area adjacent to the current block, and pixels adjacent to the first reference block, and determining a second reference block based on the second motion vector; and encoding the current block based on the first motion vector and the second reference block.

26 Claims, 10 Drawing Sheets

OTHER PUBLICATIONS

Sugimoto, Kazu et al. "Inter frame coding with template matching spatio-temporal prediction." 2004 International Conference on Image Processing (ICIP). vol. 1, Oct. 24, 2004. pp. 465-468.

Suzuki, Yoshinori et al. "Inter Frame Coding with Template Matching Average." Image Processing, ICIP 2007. IEEE. Sep. 1, 2007. pp. 409-412.

Communication dated Oct. 2, 2012 issued by the Japanese Patent Office in counterpart Japanese Patent Application No. 2010-527879.

Communication dated Feb. 5, 2013 issued by the Japanese Patent Office in counterpart Japanese Patent Application No. 2010-527879.

* cited by examiner

METHOD AND APPARATUS FOR INTER PREDICTION ENCODING/DECODING AN IMAGE USING SUB-PIXEL MOTION ESTIMATION

CROSS-REFERENCE TO RELATED PATENT APPLICATION

This application claims the benefits of U.S. Provisional Application No. 60/977,454, filed on Oct. 4, 2007, in the U.S. Patents and Trademark Office, and claims priority from Korean Patent Application No. 10-2007-0129904, filed on Dec. 13, 2007, in the Korean Intellectual Property Office, the disclosures of both of which applications are incorporated herein in their entirety by reference.

BACKGROUND OF THE INVENTION

1. Field of the Invention

The present invention relates to a method and apparatus for inter prediction encoding/decoding an image, and more particularly, to a method and apparatus for performing inter prediction by using a high precision sub-pixel, and encoding/decoding an image based on the result of inter prediction.

2. Description of the Related Art

In conventional methods of compressing an image, such as MPEG-1, MPEG-2, and MPEG-4H.264/MPEG-4 advanced video coding (AVC), a picture is divided into macro blocks in order to encode an image. Then, each macro block is encoded using inter prediction or intra prediction.

In methods of encoding an image by using inter prediction, the image is compressed by removing temporal redundancies among pictures, and a representative example of such methods is a motion estimation-based encoding method in which each motion of blocks included in a current picture is estimated by using at least one reference picture. Here, a reference block most similar to the current block is searched for within a predetermined search range of the at least one reference picture, using a predetermined evaluation function.

A sum of absolute difference (SAD) between a current block and a block included in a reference picture is calculated, and a block with the least SAD is determined as a reference block of the current block, and the determined reference block is a prediction block of the current block. A residual block of the current block is generated by subtracting the prediction block from the current block, and the compression rate of image encoding is increased by only encoding the generated residual block. A unit of a block that is encoded can be in various sizes, such as 16×16, 8×16, 16×8, 8×8, and 4×4 pixels.

Since only the residual block is encoded, the more accurate the prediction block is, and the more efficiently the current block can be compressed. Accordingly, if the reference block most similar to the current block can be found, the current block can be encoded with a high compression rate.

Hence according to H.264/AVC, sub-pixels in a pixel unit smaller than an integer pel unit are generated by performing interpolation on the reference picture, and then high precision motion estimation is performed based on the generated sub-pixels, as will be described in detail with reference to FIG. 1.

Figure 1:
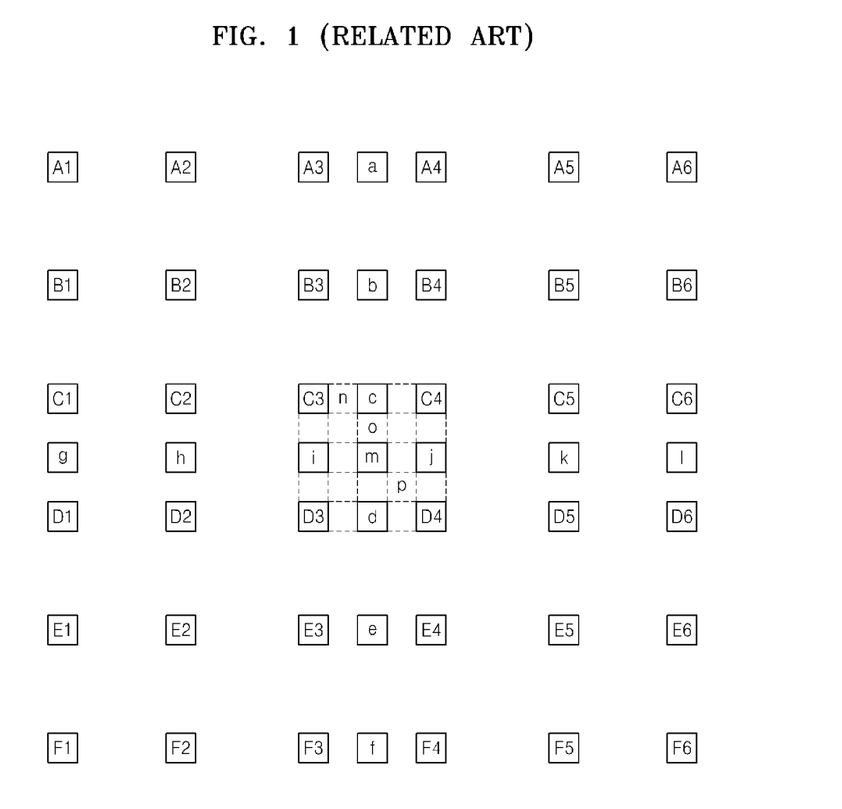
FIG. 1 is a diagram for describing a conventional method of performing interpolation.

FIG. 1 is a diagram for describing a conventional method of performing interpolation.

Referring to FIG. 1, interpolation is performed by using a 6-tap finite impulse response (FIR) filter so as to generate sub-pixels a through l in a half pel unit. Looking at vertical ½ sub-pixels a through f, the sub-pixel a is generated by performing the interpolation by using A1, A2, A3, A4, A5, and A6, and the sub-pixel b is generated by performing the interpolation by using B1, B2, B3, B4, B5, and B6. The sub-pixels c, d, e, and f are generated in the same manner.

Pixel values of the vertical ½ sub-pixels a through f are calculated as, for example, $a=(A1-5\times A2+20\times A3+20\times A4-5\times A5+A6)/32$, and $b=(B1-5\times B2+20\times B3+20\times B4-5\times B5+B6)/32$. Pixel values of the vertical ½ sub-pixels c through f are calculated in the same manner.

Like the vertical ½ sub-pixels a through f, horizontal ½ sub-pixels g through l are generated by performing interpolation using the 6-tap FIR filter. A sub-pixel g is generated by using A1, B1, C1, D1, E1, and F1, and a sub-pixel h is generated by using A2, B2, C2, D2, E2, and F2.

Pixel values of the horizontal sub-pixels can be calculated in the same manner as the pixel values of the vertical ½ sub-pixels a through f. For example, $g=(A1-5\times B1+20\times C1+20\times D1-5\times E1+F1)/32$.

The diagonal sub-pixel m in a half pel unit is interpolated by using another sub-pixel in a half pel unit. In other words, a pixel value of the sub-pixel m can be calculated by using an equation $m=(a-5\times b+20\times c+20\times d-5\times e+f)/32$.

When the sub-pixels in a half pel unit are generated, sub-pixels in a quarter pel unit can be generated by using the pixels in an integer pel unit and the sub-pixels in a half pel unit. The sub-pixels in a quarter pel unit are generated by performing linear interpolation on its two adjacent pixels.

For example, a sub-pixel n in a quarter pel unit is generated by performing linear interpolation on a pixel C3 in an integer pel unit and the sub-pixel c in a half pel unit. In other words, a pixel value of the sub-pixel n is calculated by using an equation $n=(C3+c)/2$. Also, a sub-pixel o in a quarter pel unit is generated by performing linear interpolation on the sub-pixel c in a half pel unit and the sub-pixel m in a half pel unit. Accordingly, a pixel value of the sub-pixel o is calculated by using an equation $o=(c+m)/2$. A sub-pixel p in a quarter pel unit is interpolated by using diagonal linear interpolation. A pixel value of the sub-pixel p is calculated by using an equation $p=(d+j)/2$.

As illustrated in FIG. 1, when the sub-pixels in a half pel unit and a quarter pel unit are generated by performing interpolation on the reference picture, a block with the least SAD is searched for in a quarter pel unit by comparing the interpolated reference picture and the current block. Accordingly, a motion vector in a quarter pel unit is estimated.

More bits are used when encoding the motion vector in a quarter pel unit than a motion vector in an integer pel unit. However, accurate inter prediction can be performed in a quarter pel unit, and thus the number of bits used to encode a residual block can be reduced.

However, when sub-pixels are generated by performing interpolation in a pixel unit smaller than a quarter pel unit, such as one-eighth pel unit, and a motion vector is estimated in an one-eighth pel unit based on the generated sub-pixels, too many bits are used while encoding the motion vector, and thus the compression rate may deteriorate. Accordingly, a method and apparatus for efficiently encoding a motion vector in a small pel unit is required.

SUMMARY OF THE INVENTION

The present invention provides a method and apparatus for performing inter prediction encoding on a current block by estimating a motion vector in a small pel unit while minimizing the number of bits used to encode the motion vector, and a computer readable recording medium having recorded thereon a program for executing the method.

According to an aspect of the present invention, there is provided a method of inter prediction encoding of an image, the method including: searching for a first reference block in a reference picture by using a current block, and estimating a first motion vector in a first pel unit in regards to the first reference block; estimating a second motion vector by using pixels included in a pre-encoded area adjacent to the current block, and pixels adjacent to the first reference block, and determining a second reference block based on the second motion vector; and encoding the current block based on the first motion vector and the second reference block.

The determining of the second motion vector may include: generating sub-pixels in the vicinity of the pixels adjacent to the first reference block by performing interpolation; comparing the pixels adjacent to the first reference block and the generated sub-pixels with the pixels included in the pre-encoded area adjacent to the current block; and estimating the second motion vector based on the result of the comparison.

According to another aspect of the present invention, there is provided a method of inter prediction decoding an image, the method including: receiving a bitstream including data about a current block, and, from the received bitstream, extracting data about a first motion vector in a first pel unit and data about a residual block of the current block; determining a first reference block according to the first motion vector, and determining a second reference block by using pixels included in a pre-decoded area adjacent to the current block and pixels adjacent to the first reference block; and restoring the current block based on the second reference block and the residual block.

The generating of the second reference block may include: estimating a second motion vector by using the pixels included in the pre-decoded area adjacent to the current block and the pixels adjacent to the first reference block; and determining the second reference block based on the second motion vector.

The estimating of the second motion vector may include: generating sub-pixels in the vicinity of the pixels adjacent to the first reference block by performing interpolation; comparing the pixels adjacent to the first reference block and the generated sub-pixels with the pixels included in the pre-decoded area adjacent to the current block; and estimating the second motion vector based on the result of the comparison.

According to another aspect of the present invention, there is provided an apparatus for inter prediction encoding an image, the apparatus including: a first motion estimator which searches for a first reference block in a reference picture by using a current block, and estimates a first motion vector in a first pel unit in regards to the first reference block; a second motion estimator which estimates a second motion vector by using pixels included in a pre-encoded area adjacent to the current block and pixels adjacent to the first reference block; a motion compensator which determines a second reference block based on to the second motion vector; and an encoder which encodes the current block based on the first motion vector and the second reference block.

According to another aspect of the present invention, there is provided an apparatus for inter prediction decoding an image, the apparatus including: a decoder which receives a bitstream including data about a current block, and, from the received bitstream, extracts data about a first motion vector in a first pel unit and a residual block of the current block; a motion compensator which determines a first reference block according to the first motion vector, and determines a second reference block by using pixels included in a pre-decoded area adjacent to the current block and pixels adjacent to the first reference block; and a restorer which restores the current block based on the determined second reference block and the residual block.

According to another aspect of the present invention, there is provided a computer readable recording medium having recorded thereon a program for executing the methods above.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown.

Figure 2:
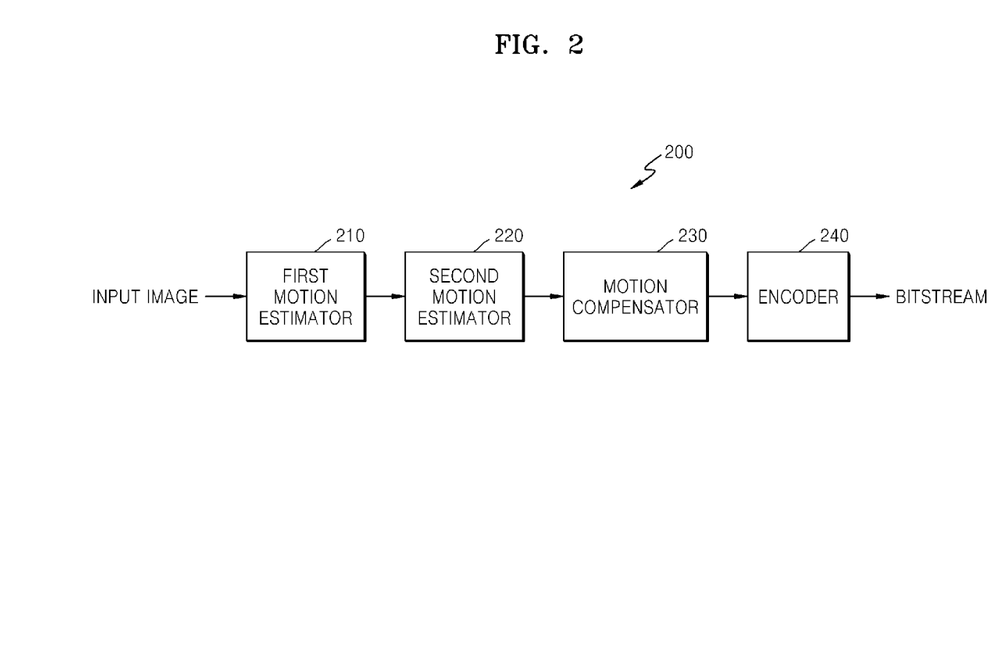
FIG. 2 is a block diagram of an apparatus for inter prediction encoding an image, according to an exemplary embodiment of the present invention.

FIG. 2 is a block diagram of an apparatus 200 for inter prediction encoding an image, according to an exemplary embodiment of the present invention.

Referring to FIG. 2, the apparatus 200 includes a first motion estimator 210, a second motion estimator 220, a motion compensator 230, and an encoder 240.

The first motion estimator 210 determines a first reference block by searching for a reference picture by using a current block, and generates a first motion vector in a first pel unit. A block having the least sum of absolute difference (SAD) is determined as the first reference block by searching for the reference picture in a first pel unit. Here, the first pel unit may be an integer pel unit, or a half or quarter pel unit used in motion estimation of H.264/AVC. When the reference picture is not a picture in the first pel unit, the reference picture is interpolated, and the first reference block is determined by searching the interpolated reference picture. Sub-pixels in a half or quarter pel unit are generated by performing interpolation based on pixels in an integer pel unit. The first motion estimator 210 determines the first reference block with the least SAD by comparing the current block and a block of the reference picture, in the same manner as a conventional motion estimation method. Thus, the first motion vector in the first pel unit is estimated according to the determined first reference block.

The second motion estimator 220 determines a second reference block by using pixels adjacent to the first reference block determined by the first motion estimator 210, and pixels included in a pre-encoded area adjacent to the current block, as will be described in detail with reference to FIG. 3.

Figure 3:
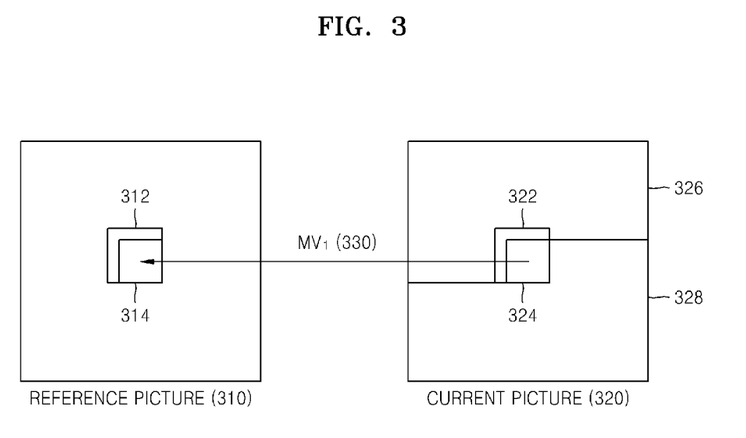
FIG. 3 is a diagram for describing a method of determining a reference block in a precise pel unit, according to an exemplary embodiment of the present invention.

FIG. 3 is a diagram for describing a method of determining a reference block in a precise pel unit, according to an exemplary embodiment of the present invention.

In FIG. 3, the apparatus 200 searches for a reference picture 310 so as to inter predict a current block 324 included in a current picture 320. The current picture 320 is divided into an area 326 encoded before the current block 324 and an area 328 that is not yet encoded.

Referring to FIG. 3, the first motion estimator 210 determines a first reference block 314 in the first pel unit as a result of searching the reference picture 310 by using the current block 324, and a first motion vector 330 is estimated according to the determined first reference block 314.

The second motion estimator 220 estimates a second motion vector (not shown) by using pixels 322 included in the area 326 and pixels 312 adjacent to the first reference block 314. The second motion vector is a motion vector used for motion estimation in a pel unit more precise than the first motion vector 330.

The second motion estimator 220 generates sub-pixels in the vicinity of the pixels 312 adjacent to the first reference block 314 by performing interpolation, and searches for pixels having the least SAD by comparing the pixels 312 and the generated sub-pixels with the pixels 322, as will be described in detail with reference to FIGS. 4 and 5.

Figure 4:
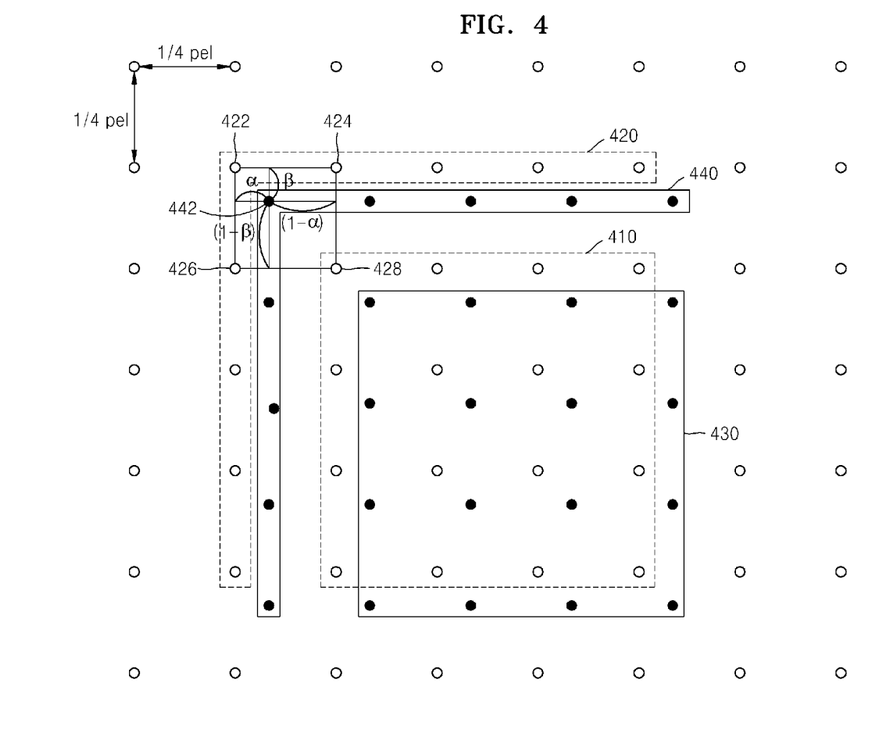
FIG. 4 is a conceptual diagram for describing a motion estimation method according to an exemplary embodiment of the present invention.

FIG. 4 is a conceptual diagram for describing a motion estimation method according to an exemplary embodiment of the present invention.

In FIG. 4, a first motion vector in a quarter pel unit and a first reference block 410 are generated as a result of motion estimation by the first motion estimator 210, and the second motion estimator 220 estimates a second motion vector in a pixel unit more precise than a quarter pel unit. Although the first motion estimator 210 performs motion estimation in a quarter pel unit in FIG. 4, it is well known to one ordinary skill in the art that the first motion estimator 210 can perform motion estimation in other pel units.

It is assumed that sub-pixels 440 are at a location that is $\alpha \times (\frac{1}{4})$ pixels away from pixels 420 adjacent to the first reference block 410 in a positive x-axis direction and $\beta \times (\frac{1}{4})$ pixels away from the pixels 420 in a negative y-axis direction, where $\alpha$ and $\beta$ are predetermined decimals between 0 and 1.

A pixel value v0 of a sub-pixel 442 at a location that is $\alpha \times (\frac{1}{4})$ pixels away from a pixel 422 in a positive x-axis direction and $\beta \times (\frac{1}{4})$ pixels away from the pixel 422 in a negative y-axis direction can be calculated as follows.

$$v0 = v1(1-\alpha)(1-\alpha) + v2(\alpha)(1-\beta) + v3(1-\alpha)(\beta) + v4(\alpha)(\beta)$$

Here, v1 denotes a pixel value of the pixel 422, v2 denotes a pixel value of a pixel 424, v3 denotes a pixel value of a pixel 426, and v4 denotes a pixel value of a pixel 428. Pixel values of the sub-pixels 440 can be calculated by performing interpolation in the same manner. $\alpha$ and $\beta$, which have the least SAD, are calculated by comparing sub-pixels generated by performing interpolation and the pixels 420 included in a pre-encoded area adjacent to the current block 324 of FIG. 3.

After calculating $\alpha$ and $\beta$, sub-pixels having the least SAD become sub-pixels that are used to estimate the second motion vector of the current block 324 according to the calculated $\alpha$ and $\beta$. In FIG. 4, the SAD is calculated by generating sub-pixels in a positive x-axis direction and a negative y-axis direction, but the second motion estimator 220 can generate sub-pixels in all directions in the vicinity of the pixels 420 adjacent to the first reference block 410, and calculate $\alpha$ and $\beta$. For example, the second motion estimator 220 can generate sub-pixels at a location that are $\alpha \times (\frac{1}{4})$ pixels away from the pixels 420 in a negative x-axis direction and $\beta \times (\frac{1}{4})$ pixels away from the pixels 420 in a positive y-axis direction, and estimate the second motion vector.

The second motion estimator 220 adjusts the first motion vector estimated by the first motion estimator 210 by comparing the sub-pixels 440 generated in the vicinity of the pixels 420 adjacent to the first reference block 410 with the pixels 322 of FIG. 3 included in a pre-encoded area adjacent to the current block 324. Accordingly, the second motion vector in a pixel unit smaller that a pixel unit, i.e., a quarter pel unit, of the first motion vector can be estimated.

Since a pixel unit smaller than a quarter pel unit is estimated by using the pixels 322 adjacent to the current block 324, a decoder can restore the second motion vector even if only information for specifying the first motion vector in a quarter pel unit is encoded. Accordingly, an accurate motion vector can be encoded by using less number of bits.

Figure 5:
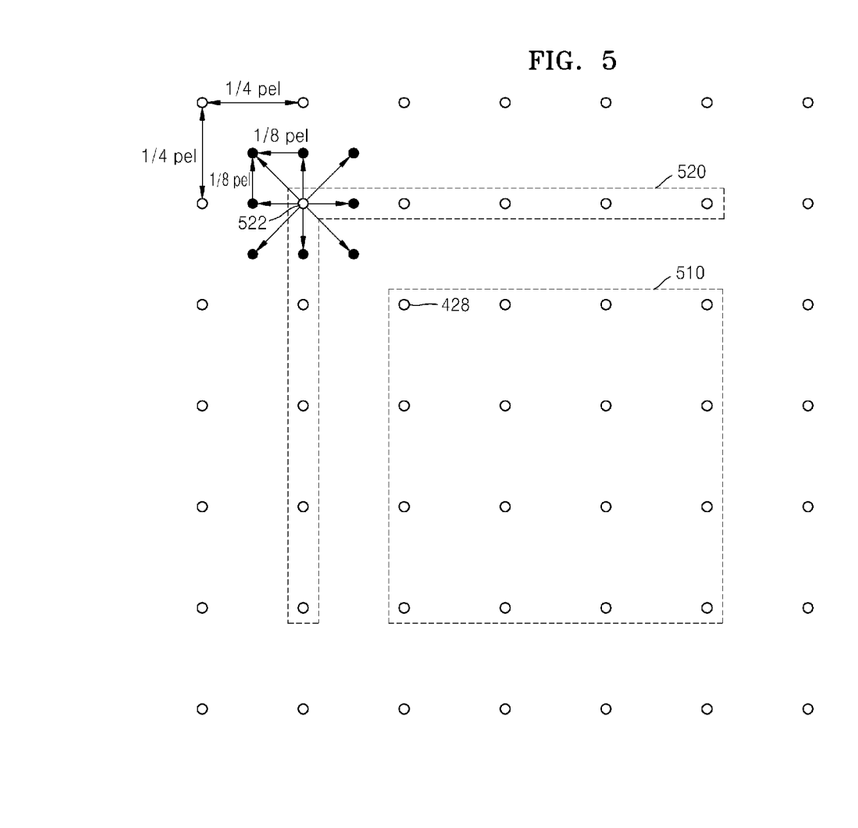
FIG. 5 is a conceptual diagram for describing a motion estimation method according to another exemplary embodiment of the present invention.

FIG. 5 is a conceptual diagram for describing a motion estimation method according to another exemplary embodiment of the present invention.

In case of the method of FIG. 4, the second motion estimator 220 has to perform a lot of operations in order to calculate $\alpha$ and $\beta$ since $\alpha$ and $\beta$ are predetermined decimals between 0 and 1. Accordingly, the second motion estimator 220 can reduce its number of operations performed by generating a limited number of sub-pixels in the vicinity of the pixels 420 adjacent to the first reference block 410, and comparing the generated sub-pixels with the pixels 322 included in the pre-encoded area adjacent to the current block 324. FIG. 5 illustrates a method of estimating a second motion vector by using such limited number of sub-pixels.

In FIG. 5, when the first motion estimator 210 estimates a first motion vector in a quarter pel unit, the second motion estimator 220 estimates a second motion vector in a one-eighth pel unit by using the first motion vector in a quarter pel unit. However, motion vectors in a quarter pel unit and a one-eighth pel unit are just examples, and it is well known to one of ordinary skill in the art that motion vectors in other pixel units can be used in the present invention. In other words, a pixel unit of the second motion vector estimated by the second motion estimator 220 may be less than one-eighth, such as a $\frac{1}{16}$ pel unit, a $\frac{1}{32}$ pel unit, or a $\frac{1}{64}$ pel unit.

Referring to FIG. 5, a first reference block 510 in a quarter pel unit is determined as a result of motion estimation by the first motion estimator 210, and pixels 520, in a quarter pel unit, adjacent to the first reference block 510 are determined. The second motion estimator 220 generates sub-pixels in a one-eighth pel unit in the vicinity of the pixels 520 by performing interpolation, and estimates a second motion vector by comparing the pixels 520 and the generated sub-pixels with the pixels 322 included in a pre-encoded area adjacent to the current block 324 of FIG. 3.

Sub-pixels at locations that are a one-eighth pel unit away from the pixels 520 adjacent to the first reference block 510 in upper, lower, left, right, upper left, lower left, upper right, and lower right directions are generated by performing interpolation, and the second motion vector is estimated by comparing the pixels 520 adjacent to the first reference block 510 and the sub-pixels generated in the 8 directions with the pixels 322. Comparing FIGS. 4 and 5, when α and β are each 0.5 in FIG. 4, the sub-pixels 440 correspond to the sub-pixels at locations that are a one-eighth pel unit away from the pixels 520 in a lower right direction.

The second motion calculator 220 has to perform a lot of operations in order to calculate α and β. However in the method according to the current exemplary embodiment of the present invention, the second motion estimator 220 estimates the second motion vector by only using the sub-pixels that are located one-eighth pel units away from the pixels 520 adjacent to the first reference block 510 in the 8 directions. The second motion vector can be estimated by performing 9 SAD calculations, since the SADs are calculated by using the pixels 520 adjacent to the first reference block 510 and the sub-pixels that are located one-eighth pel units away from the pixels 520 in the 8 directions.

Referring back to FIG. 2, the motion compensator 230 determines the second reference block 430 according to the second motion vector generated by the second motion estimator 220. The second reference block 430 that is to be used in inter predicting the current block is determined according to the second motion vector generated in a pixel unit smaller than the first pel unit of the first motion vector. Sub-pixels in a pixel unit smaller than the first pel unit are generated in the vicinity of the pixels included in the first reference block by interpolating the reference picture, and the second reference block that includes the generated sub-pixels is determined.

Referring to FIG. 4, when the second motion estimator 220 determines the sub-pixels 440 having the least SAD with the pixels 322 adjacent to the current block 324 by calculating α and β, the second motion vector is generated accordingly. The motion compensator 230 determines the second reference block 430 in a pixel unit smaller than the first pel unit, instead of the first reference block 410.

The second reference block determined according to the second motion vector, which is a motion vector in a precise pixel unit, is relatively similar to the current block 324 than the first reference block 410. Accordingly, a residual block between the current block 324 and the second reference block can be compressed with high efficiency.

Referring back to FIG. 2, the encoder 240 encodes the current block based on the first motion vector estimated by the first motion estimator 210 and the second reference block determined by the motion compensator 230.

The residual block is generated by subtracting the second reference block from the current block, and the generated residual block and the first motion vector are encoded. As described above, the first motion vector can be encoded by using a number of bits less than the number of bits used to encode the second motion vector, and the residual block is generated by using the second reference block similar to the current block. Accordingly, the compression rate of encoding an image can be improved.

Figure 6:
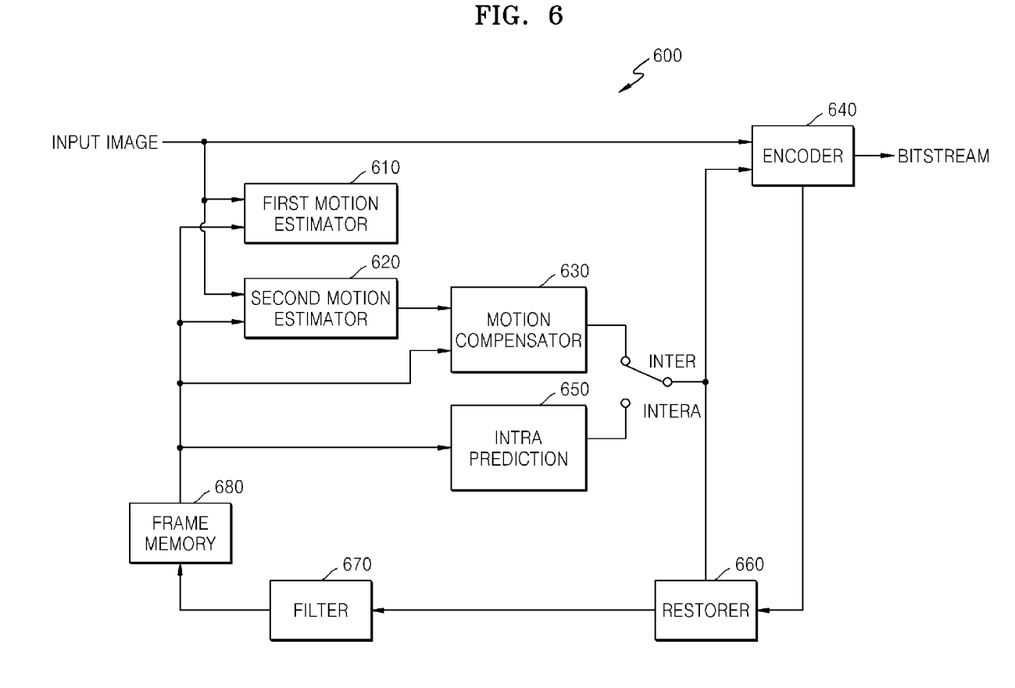
FIG. 6 is a block diagram illustrating an apparatus for encoding an image, according to an exemplary embodiment of the present invention.

FIG. 6 is a block diagram illustrating an apparatus 600 for encoding an image, according to an exemplary embodiment of the present invention.

In FIG. 6, the apparatus 600 includes the apparatus 200 illustrated in FIG. 2. Hence, the apparatus 600 includes a first motion estimator 610, a second motion estimator 620, a motion compensator 630, an encoder 640, an intra predictor 650, a restorer 660, a filter 670, and a frame memory 680, but the first motion estimator 210, the second motion estimator 220, the motion compensator 230, and the encoder 240 of FIG. 2 respectively correspond to the first motion estimator 610, the second motion estimator 620, the motion compensator 630, and the encoder 640 of FIG. 6.

The first motion estimator 610 estimates a first motion vector in a first pel unit by searching for a reference picture stored in the frame memory 680 by using a current block. Sub-pixels in the first pel unit are generated by interpolating the reference picture, and a first reference block is determined by comparing the current block and the sub-pixels. Thus, the first motion vector in the first pel unit is estimated according to the determined first reference block.

The second motion estimator 620 estimates a second motion vector by using pixels adjacent to the first reference block and pixels included in a pre-encoded area adjacent to the current block.

Sub-pixels are generated in the vicinity of the pixels adjacent to the first reference block by performing interpolation, and pixels having the least SAD are searched for by comparing the pixels adjacent to the first reference block and the generated sub-pixels with the pixels included in the pre-encoded area adjacent to the current block. The second motion vector in a pixel unit smaller than the first pel unit is estimated according to the determined sub-pixels, and this has been described in detail with reference to FIGS. 4 and 5 above.

The motion compensator 630 motion-compensates for the current block based on the second motion vector estimated by the second motion estimator 620. Sub-pixels in the vicinity of the first reference block are generated in a pixel unit that is the same as that of the second motion vector, and a block including the generated sub-pixels is determined as the second reference block that is to be used in inter predicting the current block. Thus, the second reference block is a prediction block of the current block.

The intra predictor 650 predicts the current block by performing intra prediction. The prediction block of the current block is generated by performing intra prediction by using the pixels included in the pre-encoded area adjacent to the current block by referring to the frame memory 680.

The encoder 640 encodes the current block based on the prediction block generated by the motion compensator 630 or the prediction block generated by the intra predictor 650. The optimum prediction method from among an inter prediction and an intra prediction is determined by considering a rate-distortion cost (R-D cost), and the current block is encoded by using the prediction block generated according to the determined optimum prediction method.

A residual block is generated by subtracting the prediction block from the current block, and pixel values of the generated residual block are discrete cosine transformed. Discrete cosine coefficients generated as a result of the discrete cosine transform are quantized. Next, the quantized discrete cosine coefficients are entropy encoded so as to generate a bitstream. When the current block is encoded by using intra prediction, a motion vector is also encoded and then inserted to the bitstream. According to the inter prediction according to the present invention, the first motion vector estimated by the first motion estimator 610 is encoded and inserted to the bitstream.

Upon receiving the quantized discrete cosine coefficients from the encoder 640, the restorer 660 inverse quantizes the received discrete cosine coefficients. The inverse quantized discrete cosine coefficients are inverse discrete cosine transformed, and the residual block generated as a result of the inverse discrete cosine transform is added to the prediction block generated as a result of inter prediction or intra prediction so as to restore the current block.

The filter 670 deblock filters the current block restored in the restorer 660, and the deblock filtered current block is stored in the frame memory 680.

Figure 7:
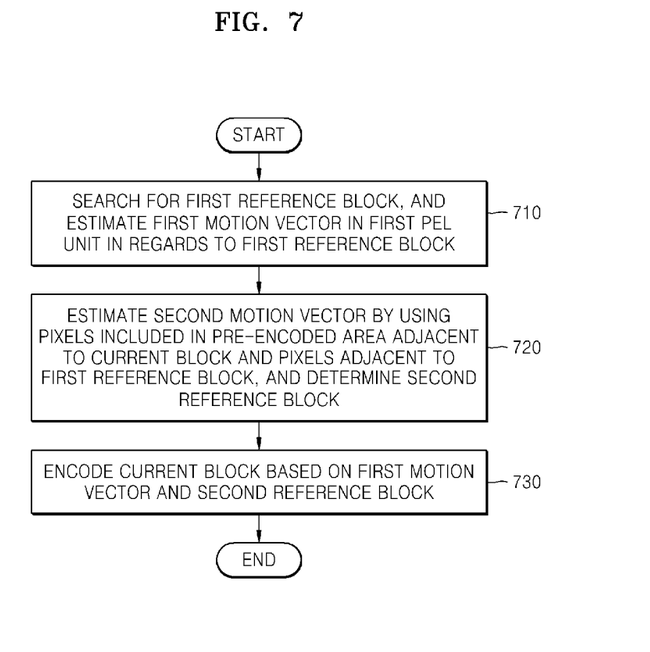
FIG. 7 is a flowchart illustrating a method of inter prediction encoding an image, according to an exemplary embodiment of the present invention.

FIG. 7 is a flowchart illustrating a method of inter prediction encoding an image, according to an exemplary embodiment of the present invention.

Referring to FIG. 7, an apparatus for inter prediction encoding an image searches for a first reference block, in a first pel unit, the first reference block corresponding to a current block, in a reference picture by using the current block, in operation 710. If the reference picture is not in the first pel unit, the reference picture is interpolated so as to generate a picture in the first pel unit, and then the first reference block is searched for in the interpolated reference picture. As a result, a first motion vector in the first pel unit is estimated in regards to the first reference block.

In operation 720, the apparatus estimates a second motion vector by using pixels included in a pre-encoded area adjacent to the current block and pixels adjacent to the first reference block. Sub-pixels in a pixel unit smaller than the first pel unit are generated in the vicinity of the pixels adjacent to the first reference block by performing interpolation, and the second motion vector is estimated by comparing the pixels adjacent to the first reference block and the generated sub-pixels with the pixels included in the pre-encoded area adjacent to the current block. A method of estimating the second motion vector has been described above with reference to FIGS. 4 and 5. When the second motion vector is estimated, and a second reference block that is to be used in inter predicting the current block is determined according to the estimated second motion vector. The second reference block is in a pixel unit smaller than the first pel unit determined according to the second motion vector, and thus the current block can be accurately inter predicted.

In operation 730, the apparatus encodes the current block based on the first motion vector estimated in operation 710 and the second reference block determined in operation 720. A residual block is generated by subtracting the second reference block from the current block, and the generated residual block and the first motion vector are inserted to a bitstream after being encoded.

The second motion vector is estimated by using the pixels adjacent to the first motion vector and the pixels included in the pre-encoded area adjacent to the current block. Accordingly, the second motion vector can be restored even if only the first motion vector is encoded, and as a result, a high precision motion vector can be encoded with less number of bits.

The generated residual block is discrete cosine transformed, and discrete cosine coefficients generated as a result of the discrete cosine transform are quantized. The quantized discrete cosine coefficients are entropy encoded and then inserted to the bitstream.

Figure 8:
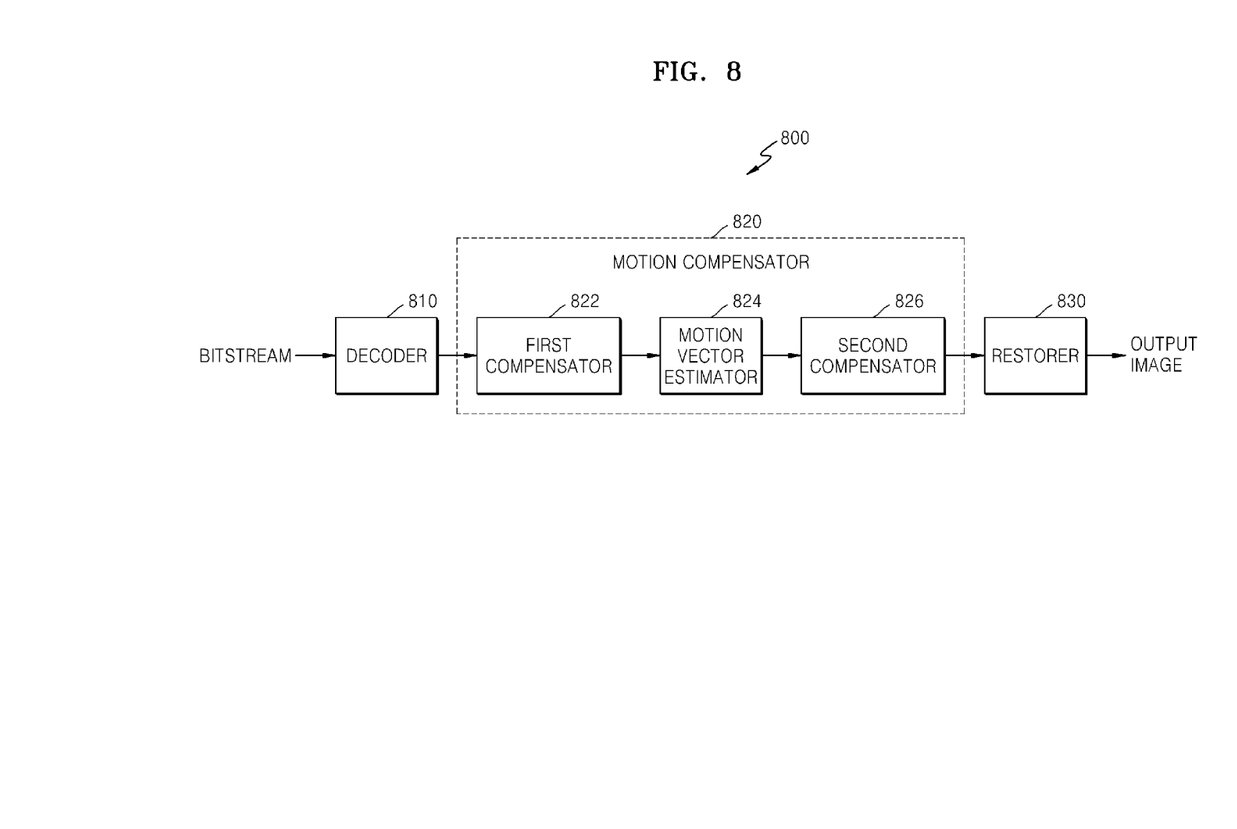
FIG. 8 is a block diagram of an apparatus for inter prediction decoding an image, according to an exemplary embodiment of the present invention.

FIG. 8 is an apparatus 800 for inter prediction decoding an image, according to an exemplary embodiment of the present invention.

Referring to FIG. 8, the apparatus 800 includes a decoder 810, a motion compensator 820, and a restorer 830, and the motion compensator 820 includes a first compensator 822, a motion vector estimator 824, and a second compensator 826.

The decoder 810 receives a bistream including data about a current block, and, from the received bitstream, extracts data about a first motion vector in a first pel unit and data about a residual block.

The residual block is generated by subtracting a second reference block, in a pixel unit smaller than the first pel unit, from the current block. The data about the residual block and included in the bitstream is entropy encoded, inverse quantized, and then inverse discrete cosine transformed so as to restore the residual block. The first motion vector in the first pel unit is restored by entropy decoding the data about the first motion vector.

The motion compensator 820 determines a first reference block in the first pel unit according to the first motion vector restored by the decoder 810. Then, a second reference block that is to be used in inter predicting the current block is determined by comparing pixels adjacent to the first reference block and pixels included in a pre-decoded area adjacent to the current block. The second reference block is in a pixel unit smaller than the first pel unit, and is determined according to a second motion vector generated based on the pixels adjacent to the first reference block and the pixels included in the pre-decoded area adjacent to the current block.

The first compensator 822 determines the first reference block according to the first motion vector decoded in the decoder 810. The first reference block is determined by performing motion compensation according to the first pel unit. Accordingly, if the reference picture is not in the first pel unit, the reference picture is interpolated so as to generate the reference picture in the first pel unit, and the motion compensation is performed on the interpolated reference picture.

The motion vector estimator 824 estimates the second motion vector by using the pixels adjacent to the first reference block and the pixels included in the pre-decoded area adjacent to the current block.

Sub-pixels in a pixel unit smaller than the first pel unit are generated in the vicinity of the pixels adjacent to the first reference block. The sub-pixels 440 at the locations that are $\alpha \times (\frac{1}{4})$ pixels away from the pixels 420 in the positive x-axis direction and $\beta \times (\frac{1}{4})$ pixels away from the pixels 420 in the negative y-axis direction may be generated as illustrated in FIG. 4, or the pixels at the locations that are a second pel unit, i.e., one-eighth pixel unit, away from the pixels 520 may be generated as illustrated in FIG. 5.

When the sub-pixels are generated, the second motion vector in a pixel unit smaller than the first pel unit is generated by comparing the pixels adjacent to the first reference block and the generated sub-pixels with the pixels included in the pre-decoded area adjacent to the current block.

The second compensator 826 motion-compensates for the current block based on the second motion vector estimated by the motion vector estimator 824. The reference picture is interpolated according to the pixel unit of the second motion vector, and the second reference block that is to be used in inter predicting the current block is determined according to the second motion vector. The determined second reference block is a prediction block of the current block.

The restorer 830 restores the current block based on the result of motion compensation of the motion compensator 826. The prediction block of the current block is generated by the second compensator 826, and the current block is restored by adding the generated prediction block and the residual block decoded by the decoder 810.

Figure 9:
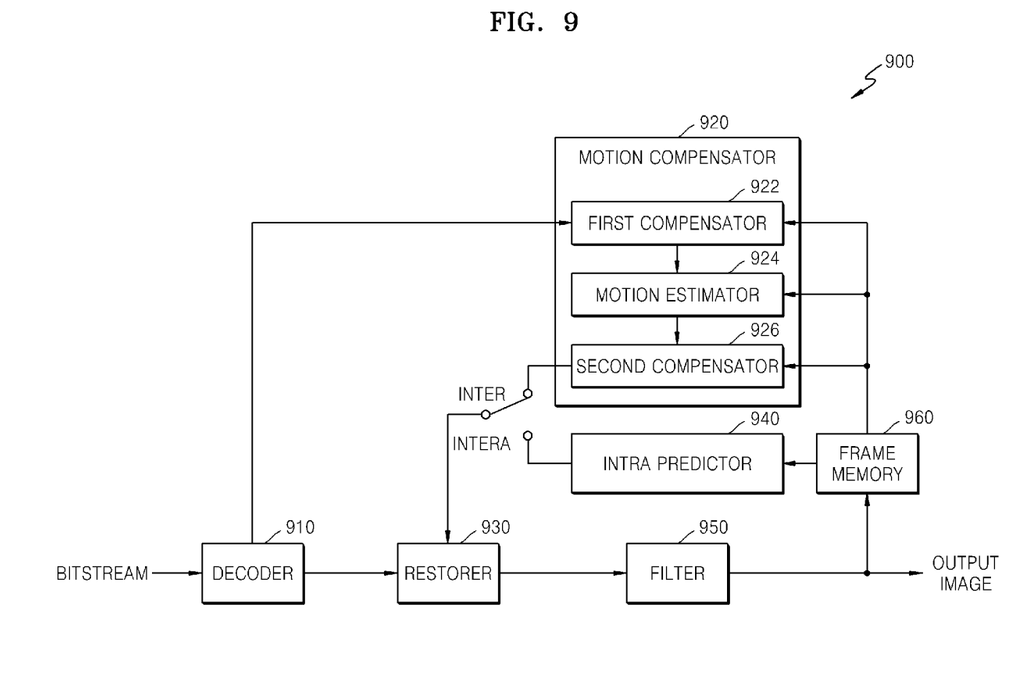
FIG. 9 is a block diagram of an apparatus for decoding an image, according to an exemplary embodiment of the present invention.

FIG. 9 is an apparatus 900 for decoding an image, according to an exemplary embodiment of the present invention.

Referring to FIG. 9, the apparatus 900 includes a decoder 910, a motion compensator 920, a restorer 930, an intra predictor 940, a filter 950, and a frame memory 960. The motion compensator 920 includes a first compensator 922, a motion estimator 924, and a second compensator 926. The decoder 810, the motion compensator 820, and the restorer 830 of FIG. 8 respectively correspond to the decoder 910, the motion compensator 920, and the restorer 930 of FIG. 9.

The decoder 910 receives a bitstream including data about a current block, and, from the received bitstream, extracts data about an encoding mode of the current block and data about a residual block. If the current block is encoded by using inter prediction, data about a first motion vector in a first pel unit is also extracted.

The motion compensator 920 searches for a first reference block, in the first pel unit and corresponding to the current block, in the reference picture stored in the frame memory 960. If the reference picture is not in the first pel unit, the reference picture is interpolated so as to generate a picture in the first pel unit, and the first reference block is searched for in the interpolated reference picture.

The first compensator 922 determines the first reference block according to the first motion vector, in the first pel unit, decoded by the decoder 910. The first reference block is determined by performing motion compensation according to the first motion vector.

The motion estimator 924 estimates a second motion vector that is to be used in inter predicting the current block by using pixels adjacent to the first reference block determined by the first compensator 922 and pixels included in a pre-decoded area adjacent to the current block.

Sub-pixels in a pixel unit smaller than the first pel unit are generated in the vicinity of the pixels adjacent to the first reference block. The second motion vector is estimated by comparing the generated sub-pixels and the pixels adjacent to the first reference block with the pixels included in the pre-decoded area adjacent to the current block.

The second compensator 926 determines a second reference block that is to be used in inter predicting the current block based on the second motion vector estimated by the motion estimator 924. The second reference block is determined by interpolating the reference picture in the same pixel unit as the second motion vector, and searching for the second motion vector in the interpolated reference picture. Hence, the determined second reference block is a prediction block of the current block.

The intra predictor 940 generates a prediction block of the current block by performing intra prediction by using the pixels included in the pre-decoded area adjacent to the current block.

The restorer 930 restores the current block based on the prediction block generated by the motion compensator 920 or the intra predictor 940. The current block is restored by adding the residual block generated by the decoder 910 and the prediction block. The restored current block is deblock filtered by the filter 950 and then stored in the frame memory 960 so as to be used in predicting another block or another picture.

Figure 10:
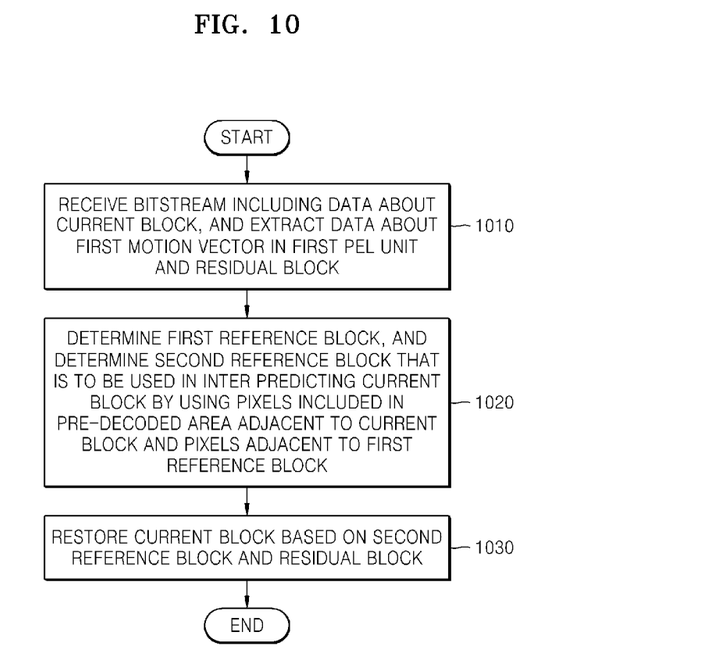
FIG. 10 is a flowchart illustrating a method of inter prediction decoding an image, according to an exemplary embodiment of the present invention.

FIG. 10 is a flowchart illustrating a method of inter prediction decoding an image, according to an exemplary embodiment of the present invention.

Referring to FIG. 10, an apparatus for inter prediction encoding an image receives a bitstream including data about a current block, and, from the received bitstream, extracts data about a first motion vector in a first pel unit and data about a residual block, in operation 1010. The data about the first motion vector is decoded so as to restore the first motion vector, and the data about the residual block is entropy decoded, inverse quantized, and then inverse discrete cosine transformed so as to restore the residual block.

In operation 1020, the apparatus determines a first reference block in the first pel unit by using the first motion vector in the first pel unit. That is, the first reference block is determined by searching in a reference picture according to the first motion vector. Here, if the reference picture is not in the first pel unit, the reference picture is interpolated, and then the first reference block is determined by searching in the interpolated reference picture.

When the first reference block is determined, a second reference block is determined by using pixels adjacent to the first reference block and pixels included in a pre-decoded area adjacent to the current block.

Sub-pixels in the vicinity of the pixels adjacent to the first reference block are generated by performing interpolation, and a second motion vector is estimated by comparing the pixels adjacent to the first reference block and the generated sub-pixels with the pixels included in the pre-decoded area adjacent to the current block.

When the second motion vector is estimated, the second reference block is determined according to the second motion vector. The reference picture is interpolated in the same pixel unit as the second motion vector, and the second reference block is determined from the interpolated reference picture. The determined second reference block is a prediction block of the current block.

In operation 1030, the apparatus restores the current block based on the second reference block determined in operation 1020. That is, the current block is restored by adding the second reference block and the residual block generated in operation 1010.

According to the present invention, the number of bits used in encoding a precise motion vector in a small pixel unit can be reduced, and thus the compression rate of image encoding can be improved.

Also, by using the precise motion vector, inter prediction can be accurately performed. Accordingly, the number of bits used in encoding a residual block can be reduced, and thus the compression rate of image encoding can be improved.

The invention can also be embodied as computer readable codes on a computer readable recording medium. The computer readable recording medium is any data storage device that can store data that can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A method of inter prediction encoding of an image, the method comprising:

searching for a first reference block in a reference picture by using a current block, and estimating a first motion vector in a first pel unit in regards to the first reference block;

estimating a second motion vector by using pixels included in a pre-encoded area adjacent to the current block, and pixels adjacent to the first reference block, and determining a second reference block based on the second motion vector; and encoding the current block based on the first motion vector and the second reference block.

2. The method of claim 1, wherein the determining of the second motion vector comprises:

generating sub-pixels in the vicinity of the pixels adjacent to the first reference block by performing interpolation;

comparing the pixels adjacent to the first reference block and the generated sub-pixels with the pixels included in the pre-encoded area adjacent to the current block; and estimating the second motion vector based on the result of the comparison.

3. The method of claim 2, wherein the sub-pixels are in a second pel unit, and the second motion vector is in the second pel unit.

4. The method of claim 3, wherein the first pel unit is a quarter pel unit and the second pel unit is a one-eighth pel unit.

5. The method of claim 4, wherein the sub-pixels in the second pel unit are sub-pixels that are a one-eighth pel unit away from the pixels adjacent to the first reference block in upper, lower, left, right, upper left, lower left, upper right, and lower right directions.

6. The method of claim 3, wherein the first pel unit is a quarter pel unit and the second pel unit is any pel unit less than one-eighth pel unit.

7. The method of claim 1, wherein the encoding further comprises:

generating a residual block of the current block by subtracting the second reference block from the current block; and encoding the first motion vector and the residual block.

8. A method of inter prediction decoding an image, the method comprising:

receiving a bitstream including data about a current block, and, from the received bitstream, extracting data about a first motion vector in a first pel unit and data about a residual block of the current block;

determining a first reference block according to the first motion vector, and determining a second reference block by using pixels included in a pre-decoded area adjacent to the current block and pixels adjacent to the first reference block; and restoring the current block based on the second reference block and the residual block.

9. The method of claim 8, wherein the generating of the second reference block comprises:

estimating a second motion vector by using the pixels included in the pre-decoded area adjacent to the current block and the pixels adjacent to the first reference block; and determining the second reference block based on the second motion vector.

10. The method of claim 9, wherein the estimating of the second motion vector comprises:

generating sub-pixels in the vicinity of the pixels adjacent to the first reference block by performing interpolation;

comparing the pixels adjacent to the first reference block and the generated sub-pixels with the pixels included in the pre-decoded area adjacent to the current block; and estimating the second motion vector based on the result of the comparison.

11. The method of claim 10, wherein the sub-pixels are in a second pel unit, and the second motion vector is in the second pel unit.

12. The method of claim 11, wherein the first pel unit is a quarter pel unit, and the second pel unit is a one-eighth pel unit.

13. The method of claim 12, wherein the sub-pixels in the second pel unit are sub-pixels that are a one-eighth pel unit away from the pixels adjacent to the first reference block in upper, lower, left, right, upper left, lower left, upper right, and lower right directions.

14. The method of claim 11, wherein the first pel unit is a quarter pel unit, and the second pel unit is any pel unit less than one-eighth pel unit.

15. The method of claim 8, wherein the restoring comprises restoring the current block by adding the residual block of the current block and the second reference block.

16. An apparatus for inter prediction encoding an image, the apparatus comprising:

a processor;

a memory interfacing with the processor;

a first motion estimator which searches for a first reference block in a reference picture by using a current block, and estimates a first motion vector in a first pel unit in regards to the first reference block;

a second motion estimator which estimates a second motion vector by using pixels included in a pre-encoded area adjacent to the current block and pixels adjacent to the first reference block;

a motion compensator which determines a second reference block based on to the second motion vector; and an encoder which encodes the current block based on the first motion vector and the second reference block.

17. The apparatus of claim 16, wherein the second motion estimator generates sub-pixels in the vicinity of the pixels adjacent to the first reference block by performing interpolation and estimates the second motion vector by comparing the pixels adjacent to the first reference block and the generated sub-pixels with the pixels included in the pre-decoded area adjacent to the current block.

18. The apparatus of claim 17, wherein the sub-pixels are in a second pel unit, and the second motion vector is in the second pel unit.

19. The apparatus of claim 18, wherein the first pel unit is a quarter pel unit and the second pel unit is a one-eighth pel unit.

20. An apparatus for inter prediction decoding an image, the apparatus comprising:

a processor;

a memory interfacing with the processor;

a decoder which receives a bitstream including data about a current block, and, from the received bitstream, extracts data about a first motion vector in a first pel unit and a residual block of the current block;

a motion compensator which determines a first reference block according to the first motion vector, and determines a second reference block by using pixels included in a pre-decoded area adjacent to the current block and pixels adjacent to the first reference block; and a restorer which restores the current block based on the determined second reference block and the residual block.

21. The apparatus of claim 20, wherein the motion compensator comprises:

a first compensator which determines the first reference block according to the first motion vector;

a motion vector estimator which estimates a second motion vector by using the pixels included in the pre-decoded area adjacent to the current block and the pixels adjacent to the first reference block; and a second compensator which determines the second reference block that is to be used in inter predicting the current block according to the second motion vector.

22. The apparatus of claim 21, wherein the motion vector estimator generates sub-pixels in the vicinity of the pixels adjacent to the first reference block by performing interpolation, and estimates the second motion vector by comparing the pixels adjacent to the first reference block and the generated sub-pixels with the pixels included in the pre-decoded area adjacent to the current block.

23. The apparatus of claim 22, wherein the sub-pixels are in a second pel unit, and the second motion vector is in the second pel unit.

24. The apparatus of claim 23, wherein the first pel unit is a quarter pel unit and the second pel unit is a one-eighth pel unit.

25. A non-transitory computer readable recording medium having recorded thereon a set of instructions for enabling a computer to implement a method comprising:
   searching for a first reference block in a reference picture by using a current block, and estimating a first motion vector in a first pel unit in regards to the first reference block;
   estimating a second motion vector by using pixels included in a pre-encoded area adjacent to the current block, and pixels adjacent to the first reference block, and determining a second reference block based on the second motion vector; and
   encoding the current block based on the first motion vector and the second reference block.

26. A non-transitory computer readable recording medium having recorded thereon a set of instructions for enabling a computer to implement a method comprising:
   receiving a bitstream including data about a current block, and, from the received bitstream, extracting data about a first motion vector in a first pel unit and data about a residual block of the current block;
   determining a first reference block according to the first motion vector, and determining a second reference block by using pixels included in a pre-decoded area adjacent to the current block and pixels adjacent to the first reference block; and
   restoring the current block based on the second reference block and the residual block.

* * * * *